(12) United States Patent
Bent et al.

(10) Patent No.: US 9,811,546 B1
(45) Date of Patent: Nov. 7, 2017

(54) STORING DATA AND METADATA IN RESPECTIVE VIRTUAL SHARDS ON SHARDED STORAGE SYSTEMS

(71) Applicant: EMC IP Holding Company LLC, Hopkinton, MA (US)

(72) Inventors: John M. Bent, Los Alamos, NM (US); Sorin Faibish, Newtown, MA (US); Zhenhua Zhang, Beijing (CN); Xuezhao Liu, Beijing (CN); Jingwang Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 285 days.

(21) Appl. No.: 14/319,301

(22) Filed: Jun. 30, 2014

(51) Int. Cl.
    *G06F 17/30* (2006.01)
(52) U.S. Cl.
    CPC .. *G06F 17/30321* (2013.01); *G06F 17/30091* (2013.01); *G06F 17/30194* (2013.01)
(58) Field of Classification Search
    CPC ..................... G06F 17/30584; G06F 17/30321
    USPC .......... 707/791–796, 802, 999.101–999.103; 711/114; 709/217
    See application file for complete search history.

(56) References Cited

U.S. PATENT DOCUMENTS

| 2009/0222462 | A1* | 9/2009 | Alpern ..................... G06F 17/30 |
| 2009/0240869 | A1* | 9/2009 | O'Krafka ............ G06F 12/0284 711/103 |
| 2010/0215175 | A1* | 8/2010 | Newson ............... G06F 21/6218 380/44 |
| 2011/0196834 | A1* | 8/2011 | Kesselman ....... G06F 17/30575 707/634 |
| 2012/0079189 | A1* | 3/2012 | Colgrove .............. G06F 3/0605 711/114 |
| 2012/0158694 | A1* | 6/2012 | Skrenta ............. G06F 17/30578 707/709 |
| 2014/0351300 | A1* | 11/2014 | Uppu .................. H04L 12/6418 707/827 |

OTHER PUBLICATIONS

"The Fast-Forward I/O and Storage Stack", https://users.soe.ucsc.edu/~ivo//blog/2013/04/07/the-ff-stack/.

\* cited by examiner

*Primary Examiner* — Syling Yen
(74) *Attorney, Agent, or Firm* — Ryan, Mason & Lewis, LLP

(57) ABSTRACT

Techniques are provided for storing data and metadata on sharded storage arrays. In one embodiment, data is processed in a sharded distributed data storage system that stores data in a plurality of shards on one or more storage nodes by providing a plurality of addressable virtual shards within each of the shards, wherein at least a first one of the addressable virtual shards stores the data, and wherein at least a second one of the addressable virtual shards stores the metadata related to the data; obtaining the data from a compute node; and providing the data and the metadata related to the data stored to the sharded distributed data storage system for storage in the respective first and second addressable virtual shards. The metadata related to the data is stored together at a portion of a corresponding stripe for the data in the second one of the addressable virtual shards. A third one of the addressable virtual shards optionally stores a checksum value related to the data.

23 Claims, 7 Drawing Sheets

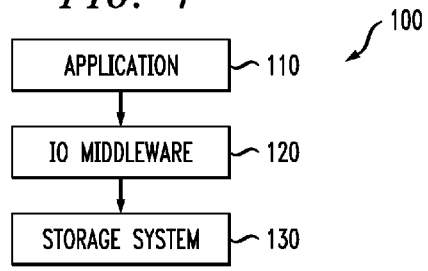
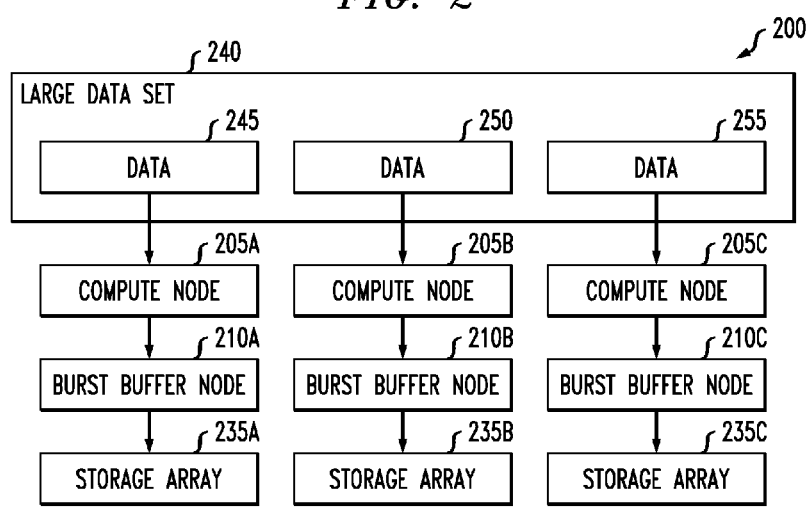
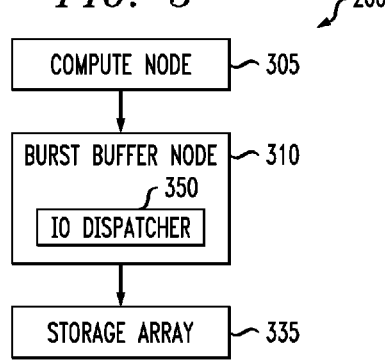

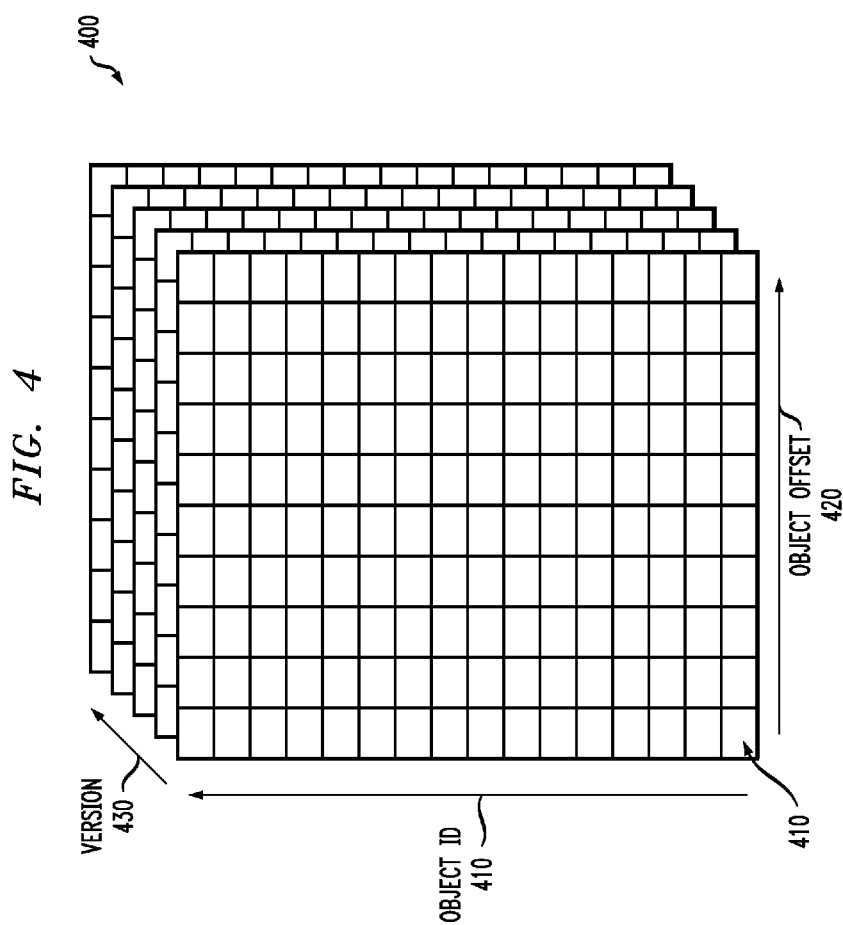

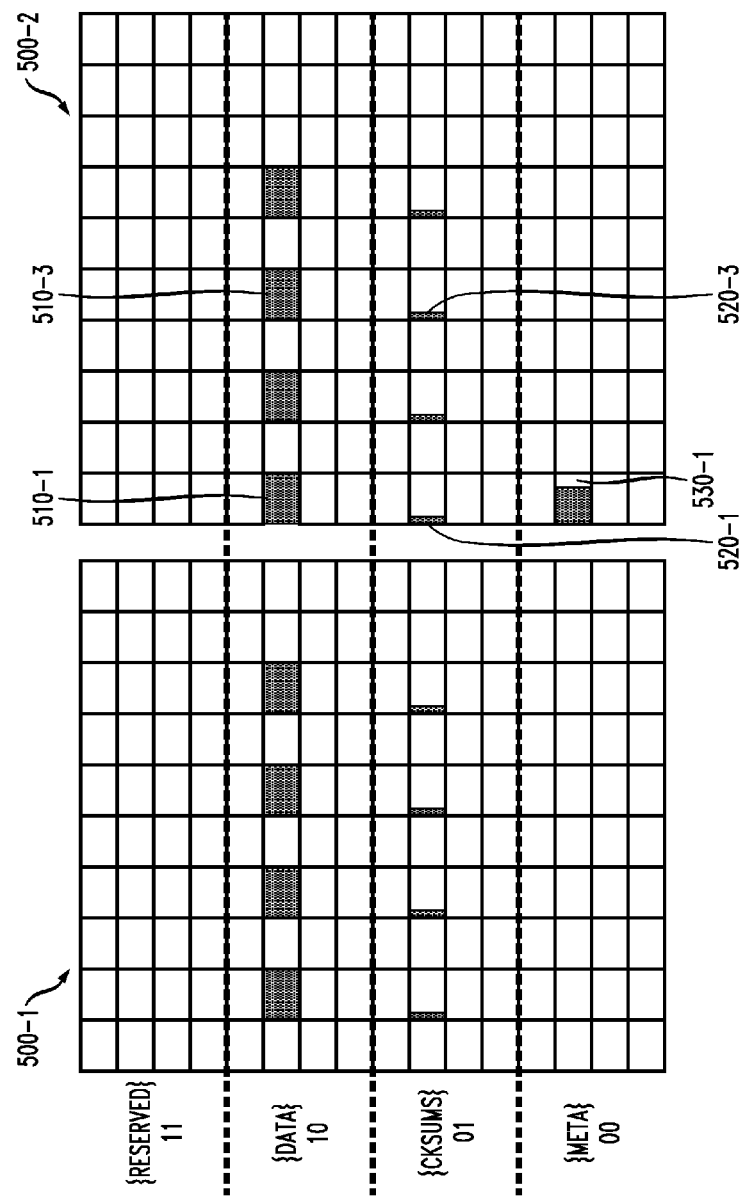

FIG. 7A

```
#!/usr/bin/env python
import sys
import struct
import optparse
import time
import os parser = optparse.OptionParser()
parser.add_option("--chunk", "-c", help="The size of the checksum chunk [def=%default]", default=16384, type="int")
parser.add_option("--stripe", "-s", help="The size of the data stripe [def=%default]", default=1048576, type="int")
parser.add_option("--shards", "-d", help="The number of shards [def=%default]", default=4, type="int")
parser.add_option("--cksum", "-z", help="The size of the checksum [def=%default]", default=8, type="int")
parser.add_option("--stripes", "-S", help="The number of data stripes to compute [def=%default]", default=8, type=int)
parser.add_option("--oid", "-o", help="The object id [def=%default]", default=3, type=int)
parser.add_option("-v", dest="verbose", action="sqtore_true" help="verbose data checking if error [default=%default]",
    default=False)
parser.add_option("-D", dest="dense", action="store_true",
    help="Use dense mode to stripe data across DAOS objects [default=%default]", default=False)
```

```
def main():
    (options, args) = parser.parse_args()
    cksums_per_stripe = options.stripe/options.chunk
    cksum_region_size = cksums_per_stripe * options.cksum if options.dense:
        mode = "dense"
    else:
        mode = "sparse"
    print\
    "OID %d, nshards=%d, stripe=%d, cksum_chunk=%d, cksum_sz=%d, nstripes=%d %s mode\n" % \
    (options.oid, options.shards, options.stripe, options.chunk, options.cksum, options.stripes, mode)
    print "%4s %4s %19s %19s %19s" % ("Strp", "Shrd", "Logical Offset", "Object Offset", "Checksum Offset")
    for i in range(0,options.stripes):
        shard = (options.oid + i) % options.shards
        d_start = i * options.stripe
        d_end = d_start + options.stripe - 1
        if options.dense:
            o_start = (i/options.shards) * options.stripe
            o_end = o_start + options.stripe - 1
        else:
            o_start = d_start
            o_end = d_end
        jw_start = o_start/options.chunk * options.cksum
        jw_end = jw_start + cksum_region_size - 1
        print "%4d %4d %9d-%9d %9d-%9d %9d-%9d" % \
            (i, shard, d_start, d_end, o_start, o_end, jw_start, jw_end)

if __name__ == "__main__": main()
```

750

STORING DATA AND METADATA IN RESPECTIVE VIRTUAL SHARDS ON SHARDED STORAGE SYSTEMS

CROSS-REFERENCE TO RELATED APPLICATIONS

The present application is related to U.S. patent application Ser. No. 14/230,829, filed Mar. 31, 2014, entitled "Distributed Metadata in a High Performance Computing Environment," incorporated by reference herein

FIELD

The present invention relates to parallel storage in high performance computing environments.

BACKGROUND

In parallel computing systems, such as High Performance Computing (HPC) applications, data storage systems must deal with the increasing amounts of data to be processed. As HPC environments grow to exascale (and larger) by becoming more distributed, sharded storage arrays comprised of a very large number of storage devices are expected to be employed. In sharded storage arrays, a user stores data on each storage device by first creating horizontally partitioned "shards" on each storage device. In order to parallelize Input/Output (I/O) operations on the sharded storage arrays, it is desirable to have shards on a large number (if not all) of the available storage devices. In addition to the user data, metadata should be distributed across the storage devices as well.

A need therefore exists for improved techniques for storing data and metadata on sharded storage arrays.

SUMMARY

Embodiments of the present invention provide improved techniques for storing data and metadata on sharded storage arrays. In one embodiment, a method is provided for processing data in a sharded distributed data storage system, wherein the sharded distributed data storage system stores the data in a plurality of shards on one or more storage nodes. The exemplary method comprises the steps of providing a plurality of addressable virtual shards within each of the shards, wherein at least a first one of the addressable virtual shards stores the data, and wherein at least a second one of the addressable virtual shards stores the metadata related to the data; obtaining the data from a compute node; and providing the data and the metadata related to the data stored to the sharded distributed data storage system for storage in the respective first and second addressable virtual shards. The metadata related to the data can be generated by an application that generates the data executing on the compute node or by the process that implements the exemplary method.

According to one aspect of the invention, the metadata related to the data is stored together at a portion of a corresponding stripe for the data in the second one of the addressable virtual shards. A third one of the addressable virtual shards optionally stores a checksum value related to the data. In one exemplary embodiment, the data comprises a data chunk and wherein the checksum value corresponds to the data chunk. In a further variation, the data chunk is further divided into a plurality of sub-chunks, and wherein each of the checksum values corresponds to one of the sub-chunks. Each of the checksum values corresponding to one of the sub-chunks is optionally stored together at a portion of a corresponding stripe of the third one of the addressable virtual shards.

Advantageously, illustrative embodiments of the invention provide techniques for storing data and metadata on sharded storage arrays. These and other features and advantages of the present invention will become more readily apparent from the accompanying drawings and the following detailed description.

BRIEF DESCRIPTION OF THE DRAWINGS

FIG. 1 illustrates an exemplary software stack comprising an application layer, an I/O middleware layer and a storage layer;

FIG. 2 illustrates an exemplary High Performance Computing (HPC) environment, in accordance with an embodiment of the present invention;

FIG. 3 illustrates portions of the exemplary High Performance Computing (HPC) environment of FIG. 2 in further detail;

FIG. 4 illustrates an exemplary conventional shard on a given storage device in the sharded storage array of FIG. 3;

FIG. 5 illustrates two exemplary shards based on the shards of FIG. 4 having a plurality of virtual shards in accordance with aspects of the present invention;

FIGS. 7A and 7B, collectively, illustrate exemplary pseudo code for a virtual shard process incorporating aspects of the present invention.

DETAILED DESCRIPTION

Figure 6A:
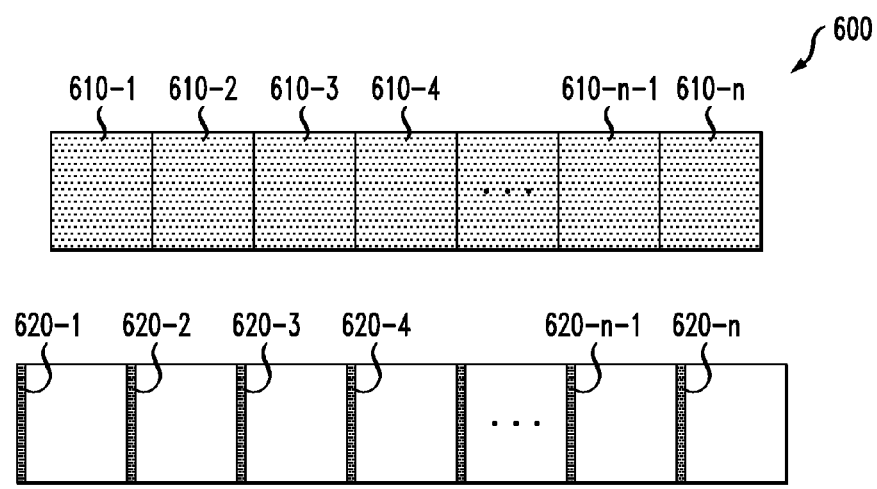
FIGS. 6A and 6B illustrate an exemplary data chunk divided into a plurality of sub-chunks, where the corresponding checksums for each sub-chunk are stored at the same offset as the corresponding sub-chunk and together in a single array, respectively.

The present invention provides improved techniques for storing data and metadata on sharded storage arrays. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Aspects of the present invention provide improved techniques for storing data and metadata on sharded storage arrays within High Performance Computing (HPC) environments. In High-Performance Computing (HPC) environments, increasing scale has made it clear that two changes are necessary in future storage architectures. First, a network attached flash tier is needed for storing large amounts of data and metadata, such as checkpoints, before the data is asynchronously migrated to a large disk tier. In addition, a new storage interface is needed to replace Portable Operating System Interface (POSIX). According to one aspect of the invention, both challenges are addressed with an Input/Output (IO) Dispatcher (IOD) that manages the burst buffer tier. Generally, the IOD will manage the storage of data and metadata on sharded storage arrays.

Aspects of the present invention recognize that the complexity of retrieving metadata and checksums associated with data can be reduced. Therefore, according to one aspect of the invention, a plurality of virtual shards are created from the single shard per storage device. The plurality of virtual shards may be employed, for example, to store the data, corresponding metadata and corresponding checksum values.

FIG. 1 illustrates an exemplary software stack 100 comprising an application layer 110, an I/O middleware layer 120 and a storage system 130. Generally, in the application layer 110, an exemplary application needs to perform the following tasks:

1. For a write of data, the application layer 110 provides data to the I/O middleware layer 120. In one embodiment, the I/O dispatcher or another entity in the I/O middleware layer 120 determines the metadata (including checksums) for the received data.

2. For a read of data, the I/O middleware layer 120 will return the data from the storage layer 130 to the application layer 110. The I/O middleware layer 120 may have to perform multiple read operations from multiple buffers and verification and recomputation of checksum values if the data chunks are not aligned.

The I/O middleware layer 120 will move data and the corresponding metadata value(s) to the storage system 130. For some intelligent I/O middleware 120, however, such as the I/O dispatcher, the I/O middleware layer 120 will do additional work with the data to obtain better performance. For example, if an application does not provide a checksum value, I/O middleware 120, such as the I/O dispatcher, will optionally compute the checksum value.

The storage layer 130 must store the data and the corresponding metadata value(s) into the desired storage device.

FIG. 2 illustrates an exemplary High Performance Computing (HPC) Environment 200, in accordance with an embodiment of the present invention. In the exemplary HPC environment 200 of FIG. 2, one or more computing nodes communicate with one or more burst buffers and data storage arrays. In various embodiments, the current disclosure may enable a HPC environment to distribute data and/or metadata (including checksum values) throughout an HPC environment on one or more data storage systems.

In the exemplary embodiment of FIG. 2, a large data set 240 is divided into two or more portions of data, such as data portions 245, 250, 255, to enable more efficient processing by each compute node. The data portions 245, 250, 255 may be generated on and processed by one or more compute nodes 205A-C. As shown in FIG. 2, data portion 245 is processed on compute node 205A, data portion 250 is processed on compute node 205B and data portion 255 is processed on compute node 205C. As discussed further below in conjunction with FIG. 3, I/O dispatchers (not shown in FIG. 2) manage data received from corresponding compute nodes 205.

While the exemplary embodiment of FIG. 2 suggests a one-to-one mapping between the burst buffer nodes 210 and storage nodes 235, I/O dispatchers may shuffle data between the burst buffer nodes 210 before sending it to storage nodes 235 (e.g., DAOS (Distributed Asynchronous Object Storage), as discussed below). The data in the burst buffer nodes 210 is logged and optionally shuffled so that the data on the storage nodes 235 is striped. Also, as discussed further below, the metadata on the burst buffer nodes 210 is logged, and it also gets shuffled so that it will be striped alongside its data on storage nodes 235 (e.g., DAOS).

It is noted that it is not required that the data is shuffled first. Instead, every burst buffer node 210 can write each of its pieces of data to wherever it will eventually go in the DAOS shards. However, this means that there will be N-squared connections as potentially every burst buffer node 210 will send small data to each DAOS shard. The shuffling is optionally performed so that instead one burst buffer 210 collects all of the data going to one shard from the other burst buffers 210 and then does one write to that shard. This reduces the number of writers per shard to just one writer process and translates a plurality of small I/O operations into one larger I/O operation.

It is further noted that small I/Os still occur during the shuffle phase. It has been found, however, that it is better to do small I/O during the shuffle phase than during the write phase since the shuffling happens on an interconnect network between the burst buffer nodes 210 as opposed to the much slower storage network connecting the DAOS shards to the burst buffer nodes 210.

Additionally, on a read, each burst buffer 210 can read from one DAOS shard only and then shuffle between the burst buffers 210. Thus, the small I/Os occur between burst buffers 210 either before sending large I/Os to DAOS or after receiving large I/Os from DAOS.

In various embodiments, each compute node 205 may be in communication with a corresponding burst buffer appliance 210A-C which may be in communication with one or more corresponding data storage arrays 235A-C. The burst buffer appliances 210 may also be referred to as I/O Nodes (IONs). As discussed further below in conjunction with FIG. 3, an exemplary burst buffer appliance 210 may include an I/O dispatcher. In some embodiments, a fast data storage buffer may be flash storage and/or another fast storage device.

FIG. 2 illustrates a workload comprised of a large parallel application executing on the compute nodes 205 and potentially a secondary analysis program running directly on the burst buffer appliances 210. In a further variation, multiple process groups can share burst buffer appliances 210. To share data among burst buffer appliances 210, the application on the compute nodes 205 and the analysis program on the burst buffer appliances 210 must be connected to the same set of I/O dispatcher (not shown in FIG. 2) processes.

In the exemplary embodiment of FIG. 2, compute node 205A is in communication with burst buffer node 210A, which is in communication with data storage array 235A. Compute node 205B is in communication with burst buffer node 210B, which is in communication with data storage array 235B. Compute node 205C is in communication with burst buffer node 210C, which is in communication with data storage array 235C.

In the embodiment of FIG. 2, each burst buffer node 210 is enabled to communicate with other burst buffer nodes 210 to enable creation, deletion, and/or management of metadata stored on each respective burst buffer node 210, as discussed further below in conjunction with FIG. 3.

FIG. 3 illustrates portions of the exemplary High Performance Computing (HPC) environment 200 of FIG. 2 in further detail. As shown in FIG. 3, the exemplary HPC environment 200 comprises an exemplary compute node 305 in communication with a burst buffer appliance 310, which may be in communication with one or more data storage arrays 335. Generally, as discussed further below, compute node 305 sends one or more data chunks and corresponding metadata to be processed by burst buffer node 310, in accordance with an embodiment of the present invention.

The data storage arrays 335 may be implemented, for example, as Distributed Application Object Storage (DAOS) sharded storage arrays. See, for example, "The Fast-Forward I/O and Storage Stack," https://users.soe.ucsc.edu/~ivo//blog/2013/04/07/the-ff-stack/, and/or "Fast Forward Storage and IO Program Documents," https://wiki.hpdd.intel.com/display/PUB/Fast+Forward+Storage+and+IO+Program+Documents, each incorporated by reference herein.

The exemplary burst buffer node 310 further comprises an I/O dispatcher 350. As discussed hereinafter, the I/O dispatcher 350 processes any received data based on the indicated object type and the storage destination. In one exemplary implementation, the data may comprise a blob, a multidimensional array or a key-value object type. Array objects store structured multidimensional data structures. Blob objects are analogous to POSIX files: one-dimensional arrays (e.g., streams) of bytes. Key-value objects are stored in a parallel key-value store. In this manner, aspects of the present invention support storage of user data in structured array objects, unstructured "blob" objects and key-value objects.

Generally, data having a blob or array object type is transformed out of a PLFS (Parallel Log Structured File System) environment in the burst buffer node 310 for storage on storage array 335. See, for example, John Bent et al., "PLFS: A Checkpoint Filesystem for Parallel Applications," Intl Conf. for High Performance Computing, Networking, Storage and Analysis 2009 (SC09) (November 2009), incorporated by reference herein. Likewise, data having a key-value object type is stored in an MDHIM (Multidimensional Data Hashing Indexing Metadata/Middleware) server (not shown). For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

The burst buffer node 310 is assumed to comprise a flash memory or other high-speed memory having a substantially lower access time than a disk storage tier. The burst buffer node 310 may optionally comprise an analytics engine, and may include other components. Although flash memory will often be used for the high-speed memory of the burst buffer node 310, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer node" or "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes and a file system, such as storage tiers, for storing bursts of data associated with different types of I/O operations.

The burst buffer node 310 further comprises a processor coupled to a memory (not shown in FIG. 3). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

As discussed hereinafter, the exemplary I/O dispatcher 350 performs any necessary recomputations when requested data chunks are not aligned.

In FIG. 3, an I/O dispatcher 350 in a given burst buffer node 310 is enabled to communicate with other I/O dispatchers on other burst buffer nodes 310 to coordinate and/or synchronize data, transactions, checkpoints, and/or events stored at the respective I/O dispatcher.

As noted above, the exemplary I/O dispatcher 350 processes three exemplary object types, namely, blobs (in a similar manner to existing POSIX directories); arrays (when stored, arrays are "unrolled" into a blob); and key-value stores. Containers provide a mechanism for grouping multiple objects together. It is noted that key-value stores typically store checksums as a header in the value portion of the record. Additional metadata can be stored in the key-value header as well, such as value length.

As noted above, data is stored in the burst buffer node 310 in PLFS-style logfiles. When the PLFS data is migrated to the storage array 335, the exemplary I/O dispatcher 350 will "flatten" the data as stripes in a round-robin fashion across shards.

FIG. 4 illustrates an exemplary conventional shard 400 on a given storage device in the sharded storage array 335 of FIG. 3. As shown in FIG. 4, an exemplary shard 400 is a three-dimensional structure with an object identifier 410 identifying each stored object in a first dimension, an object offset 420 identifying the offset of the stored object in a second dimension, and an optional version identifier 430 identifying the version of the stored object in a third dimension. For example, an object having identifier 13 will be striped across all shards at object 13. In one exemplary implementation, the starting shard for a given object will be randomly varied so that not all objects start on shard 0. Thus, each stored object has an associated starting shard identifier indicating which shard has the first stripe of the object. The object offset 420 allows each object to be addressable with a particular granularity, such as a byte. Each element in the array 400, such as element 410, corresponds to a data chunk.

FIG. 5 illustrates two exemplary shards 500-1 and 500-2 based on the shards 400 of FIG. 4. The exemplary shards 500-1 and 500-2 are divided into a plurality of virtual shards 00, 01, 10, 11. In the exemplary embodiment of FIG. 5, virtual shard 00 stores metadata associated with the stored object, virtual shard 01 stores checksum values associated with the stored object, virtual shard 10 stores the data chunks of the stored object and virtual shard 11 is reserved for future use. It is noted that the optional version dimension of FIG. 4 is not shown in FIG. 5 for ease of illustration.

For example, as shown in FIG. 5, the data chunks for the storage object having an object identifier 410 equal to 3 are stored in the third row of virtual shard 10 of each shard, referred to as {10}{3} on each shard. The metadata corresponding to each data chunk of the storage object is stored in virtual shard 01, referred to as {01}{3} on each shard, with the same object offset 420 as the corresponding data chunk. The first stripe of the object is stored in shard 500-2 for the storage object, since the associated metadata for the storage object is stored in virtual shard 00 of the first column of shard 500-2, referred to as {00}{3} on each shard. The data is said to be striped across objects {10}{3} on each shard, starting at shard 500-2.

For example, the first data chunk 510-1 for the storage object having an object identifier 410 of 3 is stored in the data virtual shard 10 of shard 500-2 with an object offset 420 of zero, and the subsequent data chunks 510 for the same storage object are striped across objects {10}{3} on each shard, starting at shard 500-2. In addition, the checksum 520-1 for the first data chunk 510-1 for the storage object having an object identifier 410 of 3 is stored in the checksum virtual shard 01 of shard 500-2 with an object offset 420 of zero. Likewise, the metadata 530-1 for the storage object having an object identifier 410 of 3 is stored in the metadata virtual shard 00 of shard 500-2 with an object offset 420 of zero.

Assuming an object identifier (OID) 410 is comprised of 62 bits, the associated metadata is read by reading object {00}{OID}, by prepending two bits to the 62-bit OD to identify the virtual shard since the DAOS object ID space within each exemplary DAOS shard is 64 bits. Likewise, the checksum associated with the same object identifier 410 is read by reading object {01}{OID}. The storage object itself is read by reading object {10}{OID}.

As noted above, data for a given object identifier 410 is striped in a round-robin fashion in object {10}{OID} across a set of shards 500. It has been found that sharded storage arrays 335 are good at sparse objects and can flatten overwrites nicely with transactions. In fact, sharded storage arrays 335 are even better at dense objects, which is why an embodiment of the invention employs shuffling. Also, this is why metadata entries and the checksums are compressed, as discussed below in conjunction with FIGS. 6A and 6B. Thus, the data is placed at the same physical offset as the logical target offset (which reduces metadata).

The metadata corresponding to a given object identifier 410 is obtained by getting a list of shards from the container. A Hash(OID) function is applied to the shard list to find the target shard 500. The desired metadata is obtained by reading object {00}{OID} on the identified shard. The metadata is typically quite small, comprising, for example, a list of shards across which this object is striped; a checksum unit size; a stripe size (a multiple of the checksum unit size); the last offset of the object; the dimensionality info for array objects; and scratch-pad contents.

The data for a given block B of object OID is stored at {10}{OID} in the appropriate shard given the stripe size and list of shards for OID (as explained above). Therefore, the checksum for block B is stored at {01}{OID} in the same shard.

In one variation, a given shard 500 (FIG. 5) can be divided into only two virtual shards, with a first virtual shard storing the data chunks, and a second virtual shard storing the metadata and checksum values in a single virtual shard. For example, the checksum for a given data chunk can be stored in a predefined portion, such as the second half, of the metadata chunk that corresponds to the data chunk. In this manner, only a single bit is needed to identify a desired virtual shard.

FIG. 6A illustrates an exemplary data chunk 600, which may correspond, for example, to data chunk 510-1 of FIG. 5. As shown in FIG. 6A, in one exemplary implementation, data chunk 600 is divided into a plurality of sub-chunks 610-1 through 610-$n$. A corresponding checksum 620-$i$ is created for each sub-chunk 610-$i$. Since the size of each checksum 620-$i$ is much smaller than the size of each corresponding sub-chunk 610-$i$, the checksums 620-$i$ are considered "sparse files," comprising small regions of memory that are written and the remainder of the file is not written. While sharded storage arrays 235 may process sparse files efficiently, it is still desirable to avoid the numerous small I/O operations if the checksums 620 were all stored at the same object offset 420 as the corresponding data chunk 610, as shown in FIG. 6A.

Figure 6B:
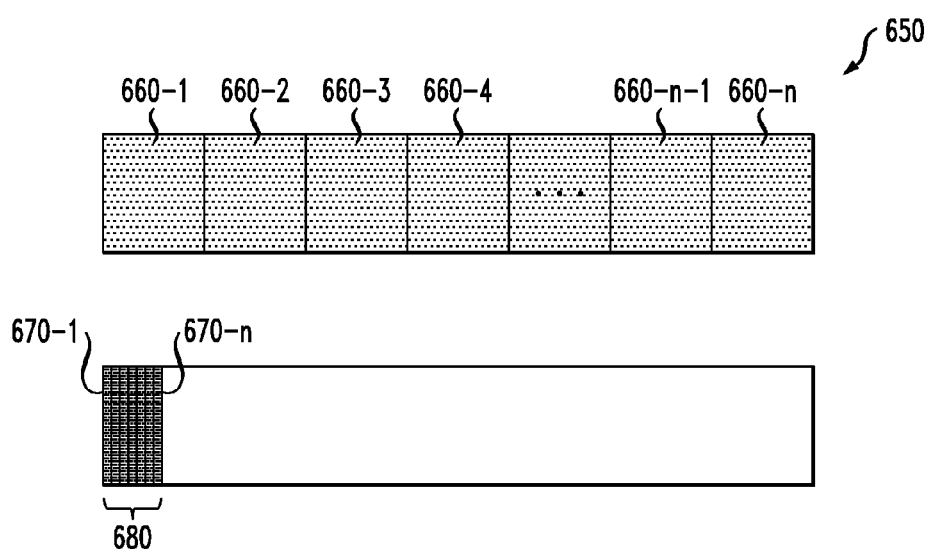

FIG. 6B illustrates an exemplary data chunk 650, which may correspond, for example, to data chunk 510-1 of FIG. 5. As shown in FIG. 6B, in an alternate implementation, data chunk 650 is divided into a plurality of sub-chunks 660-1 through 660-$n$ and a corresponding checksum 670-$i$ is created for each sub-chunk 660-$i$, in a similar manner to FIG. 6A. In the exemplary implementation of FIG. 6B, however, all of the checksums 670-$i$ are stored in an array 680 of checksums for each stripe that are stored together at the beginning (e.g., offset zero) of the corresponding stripe of the checksum virtual shard 01, such as the position of checksum 520-1 in FIG. 5. In a further variation, an additional checksum value can be stored for the entire data chunk 650, in addition to the checksum values 670 stored for the sub-chunks 660.

FIGS. 7A and 7B, collectively, illustrate exemplary pseudo code 700, 750 for a virtual shard process incorporating aspects of the present invention. As shown in FIG. 7A, an exemplary implementation allows a user to specify a size for checksum chunks, data stripes and checksums, as well as a number of shards and data stripes to be computed.

As shown in FIG. 7B, an exemplary implementation supports a dense mode and a sparse mode. In a dense mode, only two virtual shards are employed (for data chunks and corresponding metadata and checksums, respectively).

In a sparse mode, all of the checksums 670-$i$ are stored in an array 680 of checksums for each stripe at the beginning (e.g., offset zero) of the corresponding stripe of the checksum virtual shard 01, as discussed above in conjunction with FIG. 6B.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

Figure 8:
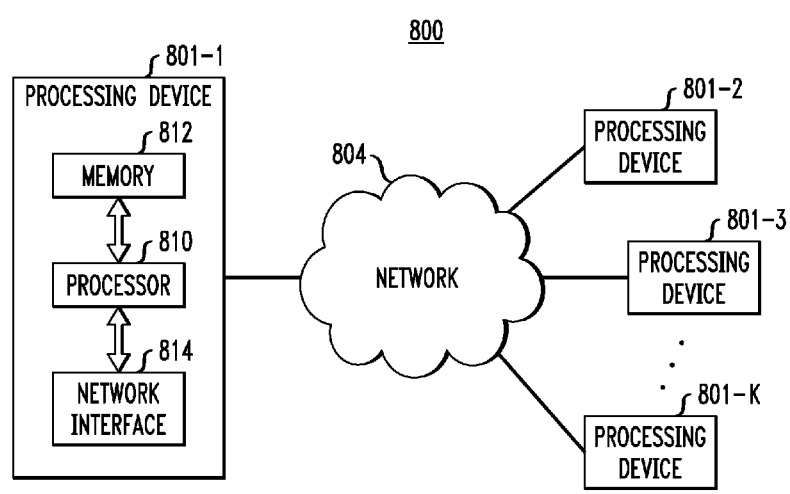
FIG. 8 illustrates an exemplary processing platform in which aspects of the present invention can be employed.

FIG. 8 illustrates an exemplary processing platform in which aspects of the present invention can be employed. The exemplary processing platform 800 comprises a plurality of processing devices, denoted 801-1, 801-2, 801-3, . . . 801-K, that communicate with one another over a network 804. The network 804 may comprise any type of network, such as a WAN, a LAN, a satellite network, a telephone or cable network, or various portions or combinations of these and other types of networks.

The processing device 801-1 in the processing platform 800 comprises a processor 810 coupled to a memory 812. The processor 810 may comprise a microprocessor, a microcontroller, an application-specific integrated circuit (ASIC), a field-programmable gate array (FPGA) or other type of processing circuitry, as well as portions or combinations of such circuitry elements, and the memory 812, which may be viewed as an example of a "computer program product" having executable computer program code embodied therein, may comprise random access memory (RAM), read-only memory (ROM) or other types of memory, in any combination.

Also included in the processing device 801-1 is network interface circuitry 814, which is used to interface the processing device with the network 804 and other system components, and may comprise conventional transceivers.

The other processing devices 801 of the processing platform 800 are assumed to be configured in a manner similar to that shown for processing device 801-1 in the figure.

Again, the particular processing platform 800 shown in FIG. 8 is presented by way of example only, and system 200 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the replicated file system synchronization techniques disclosed herein. Also, the particular configuration of system and device elements shown in FIGS. 2, 3 and 5 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for processing data in a sharded distributed data storage system, wherein the sharded distributed data storage system stores said data in a plurality of shards on one or more storage nodes, said method comprising:
   providing a plurality of addressable virtual shards within each of said plurality of shards, wherein at least a first one of said plurality of addressable virtual shards stores said data and wherein at least a second different one of said plurality of addressable virtual shards separately stores metadata related to said data, wherein said data and said corresponding metadata related to said data are stored within said first and second addressable virtual shards, respectively, with a same object offset;
   obtaining, at a first burst buffer appliance, said data for a given shard from at least a second burst buffer appliance connected to said first burst buffer appliance by an interconnect network; and
   providing, by said first burst buffer appliance, said data for said given shard and said metadata related to said data for said given shard to said sharded distributed data storage system using a single write operation for storage in said respective first and second addressable virtual shards.

2. The method of claim 1, wherein said metadata related to said data is generated by an application that generates said data executing on said compute node.

3. The method of claim 1, further comprising the step of generating said metadata related to said data.

4. The method of claim 1, wherein said metadata related to said data is stored together at a portion of a corresponding stripe for said data in the second one of said addressable virtual shards.

5. The method of claim 1, wherein at least a third one of said plurality of addressable virtual shards stores a checksum value related to said data.

6. The method of claim 5, wherein said data comprises a data chunk and wherein said checksum value corresponds to said data chunk.

7. The method of claim 5, wherein said data comprises a data chunk and wherein said data chunk is further divided into a plurality of sub-chunks and wherein each of a plurality of said checksum values corresponds to one of said sub-chunks.

8. The method of claim 7, wherein each of said plurality of checksum values corresponding to one of said sub-chunks is stored together at a portion of a corresponding stripe of the third one of said addressable virtual shards.

9. The method of claim 1, wherein each of said plurality of addressable virtual shards within each of said plurality of shards is indexed by a unique binary value.

10. The method of claim 1, wherein said method is implemented by said first burst buffer appliance.

11. An apparatus for processing data in a sharded distributed data storage system, wherein the sharded distributed data storage system stores said data on a plurality of shards on one or more storage nodes, said apparatus comprising:
    a memory; and
    at least one hardware device operatively coupled to the memory and configured to:
    provide a plurality of addressable virtual shards within each of said plurality of shards, wherein at least a first one of said plurality of addressable virtual shards stores said data and wherein at least a second different one of said plurality of addressable virtual shards separately stores metadata related to said data, wherein said data and said corresponding metadata related to said data are stored within said first and second addressable virtual shards, respectively, with a same object offset;
    obtain, at a first burst buffer appliance, said data for a given shard from at least a second burst buffer appliance connected to said first burst buffer appliance by an interconnect network; and
    provide, by said first burst buffer appliance, said data for said given shard and said metadata related to said data for said given shard to said sharded distributed data storage system using a single write operation for storage in said respective first and second addressable virtual shards.

12. The apparatus of claim 11, wherein said metadata related to said data is generated by an application that generates said data executing on said compute node.

13. The apparatus of claim 11, wherein said at least one hardware device is further configured to generate said metadata related to said data.

14. The apparatus of claim 11, wherein said metadata related to said data is stored together at a portion of a corresponding stripe for said data in the second one of said addressable virtual shards.

15. The apparatus of claim 11, wherein at least a third one of said plurality of addressable virtual shards stores a checksum value related to said data.

16. The apparatus of claim 15, wherein said data comprises a data chunk and wherein said checksum value corresponds to said data chunk.

17. The apparatus of claim 15, wherein said data comprises a data chunk and wherein said data chunk is further divided into a plurality of sub-chunks and wherein each of a plurality of said checksum values corresponds to one of said sub-chunks.

18. The apparatus of claim 17, wherein each of said plurality of checksum values corresponding to one of said sub-chunks is stored together at a portion of a corresponding stripe of the third one of said addressable virtual shards.

19. The apparatus of claim 11, wherein each of said plurality of addressable virtual shards within each of said plurality of shards is indexed by a unique binary value.

20. The apparatus of claim 11, wherein said apparatus comprises said first burst buffer appliance.

21. An article of manufacture for processing data in a sharded distributed data storage system, wherein the sharded distributed data storage system stores said data on a plurality of shards on one or more storage nodes, said article of manufacture comprising a non-transitory machine readable recordable storage medium containing one or more programs which when executed implement the steps of:

providing a plurality of addressable virtual shards within each of said plurality of shards, wherein at least a first one of said plurality of addressable virtual shards stores said data and wherein at least a second different one of said plurality of addressable virtual shards separately stores metadata related to said data, wherein said data and said corresponding metadata related to said data are stored within said first and second addressable virtual shards, respectively, with a same object offset;

obtaining, at a first burst buffer appliance, said data for a given shard from at least a second burst buffer appliance connected to said first burst buffer appliance by an interconnect network; and providing, by said first burst buffer appliance, said data for said given shard and said metadata related to said data for said given shard to said sharded distributed data storage system using a single write operation for storage in said respective first and second addressable virtual shards.

22. The method of claim 1, further comprising the step of a first one of said first and second burst buffer appliances reading said given shard using a single read operation and providing at least a portion of said given shard to a second one of said first and second burst buffer appliances.

23. The apparatus of claim 11, wherein a first one of said first and second burst buffer appliances reads said given shard using a single read operation and providing at least a portion of said given shard to a second one of said first and second burst buffer appliances.

* * * * *